United States Patent [19]

Barkan

[11] Patent Number: 5,408,081
[45] Date of Patent: Apr. 18, 1995

[54] DIGITAL CIRCUIT FOR A LASER SCANNER USING A FIRST DERIVATIVE SIGNAL AND A COMPARISON SIGNAL

[75] Inventor: Edward Barkan, Miller Place, N.Y.

[73] Assignee: Symbol Technologies, Inc., Bohemia, N.Y.

[21] Appl. No.: 28,107

[22] Filed: Mar. 8, 1993

Related U.S. Application Data

[60] Continuation-in-part of Ser. No. 721,951, Jun. 27, 1991, abandoned, which is a division of Ser. No. 570,074, Apr. 13, 1990, Pat. No. 5,059,779, which is a continuation-in-part of Ser. No. 367,335, Jun. 19, 1989, Pat. No. 5,124,539.

[51] Int. Cl.⁶ ............................................. G06K 7/10
[52] U.S. Cl. ................................................ 235/462
[58] Field of Search ...................................... 235/462

[56] References Cited

U.S. PATENT DOCUMENTS

| | | | |
|---|---|---|---|
| 3,360,659 | 12/1967 | Young | 250/236 |
| 3,685,723 | 8/1972 | Berler | 235/61.11 |
| 3,699,321 | 10/1972 | Gibson | 235/152 |
| 3,892,949 | 7/1975 | Dodson | 235/462 |
| 4,000,397 | 12/1976 | Hebert et al. | 235/61.11 |
| 4,059,224 | 11/1977 | Seligman | 235/462 |
| 4,109,316 | 8/1978 | Snyder | 365/127 |
| 4,113,343 | 9/1978 | Pole et al. | 350/3.71 |
| 4,115,703 | 9/1978 | Dobras | 250/568 |
| 4,118,675 | 10/1978 | Rahn et al. | 331/94.5 |
| 4,158,435 | 6/1979 | Nakanishi et al. | 235/463 |
| 4,160,156 | 7/1979 | Sherer | 235/463 |
| 4,182,956 | 1/1980 | Funk, Jr. et al. | 250/239 |
| 4,210,802 | 7/1980 | Sakai | 235/483 |
| 4,277,127 | 7/1981 | Smith et al. | 350/3.67 |
| 4,305,646 | 12/1981 | Bechtold | 354/5 |
| 4,356,389 | 10/1982 | Quirey et al. | 235/455 |
| 4,455,485 | 6/1984 | Hosaka et al. | 250/234 |
| 4,528,444 | 7/1985 | Hara et al. | 235/462 |
| 4,560,862 | 12/1985 | Eastman et al. | 235/467 |
| 4,570,057 | 2/1986 | Chadima, Jr. et al. | 235/472 |
| 4,578,568 | 3/1986 | Tsuzuki | 235/436 |
| 4,578,571 | 3/1986 | Williams | 235/472 |
| 4,740,675 | 4/1988 | Brosnan et al. | 235/462 |
| 4,749,879 | 6/1988 | Peterson et al. | 307/354 |
| 4,760,248 | 7/1988 | Swartz et al. | 235/472 |
| 4,795,224 | 1/1989 | Goto | 350/6.3 |
| 4,801,788 | 1/1989 | Osaka | 235/462 |
| 4,870,367 | 9/1989 | Nakase et al. | 328/168 |
| 5,061,843 | 10/1991 | Sato et al. | 235/462 |
| 5,068,520 | 11/1991 | Sato | 235/462 |
| 5,140,146 | 8/1992 | Metlitsky et al. | 235/463 |
| 5,210,397 | 5/1993 | Eastman | 235/436 |
| 5,272,323 | 12/1993 | Martino | 235/462 |
| 5,294,783 | 3/1994 | Hammond, Jr. et al. | 235/462 |

FOREIGN PATENT DOCUMENTS 0469305 2/1992 European Pat. Off. .

Primary Examiner—John Sheppard
Attorney, Agent, or Firm—Finnegan, Henderson, Farabow, Garrett and Dunner

[57] ABSTRACT

A circuit for digitizing an analog electric signal generated from a photoelectronic conversion of reflected light when scanning indicia having spatially-separated, light-reflective portions includes a differentiator circuit for generating a first derivative signal representing a first derivative of the analog signal. A comparison signal generating circuit generates a comparison signal and an output circuit, coupled to the differentiator circuit and to the signal generating circuit, compares the first derivative signal and the comparison signal to generate an output signal indicating a change in the intensity of the reflected light. An output controller, coupled to the output means, controls passage of the digital output signal.

6 Claims, 14 Drawing Sheets

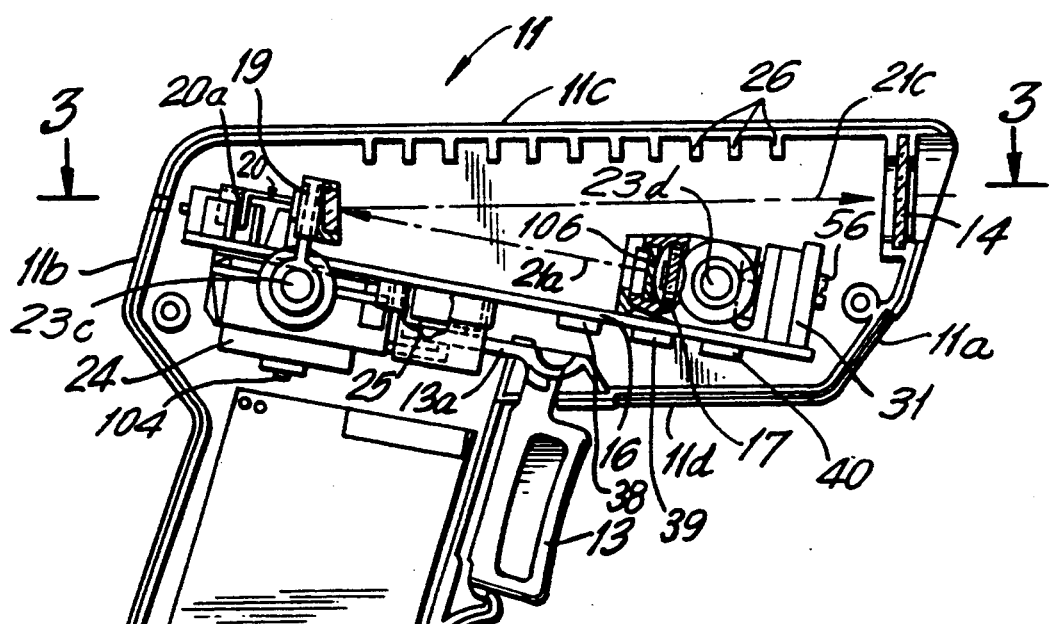
FIG. 2
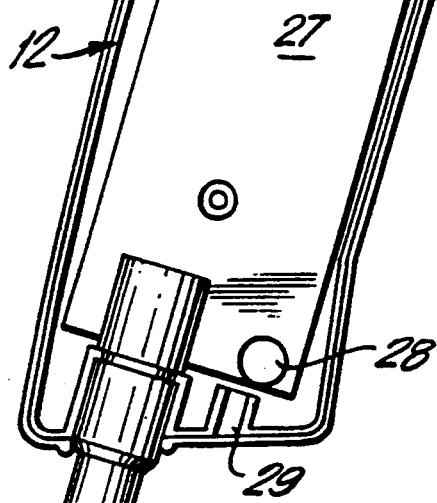
FIG. 3
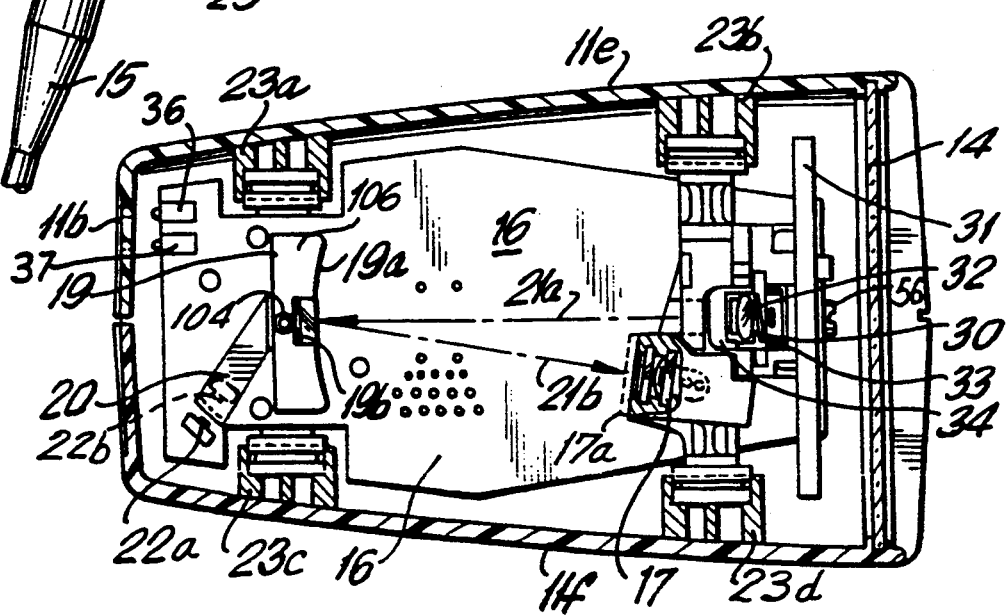

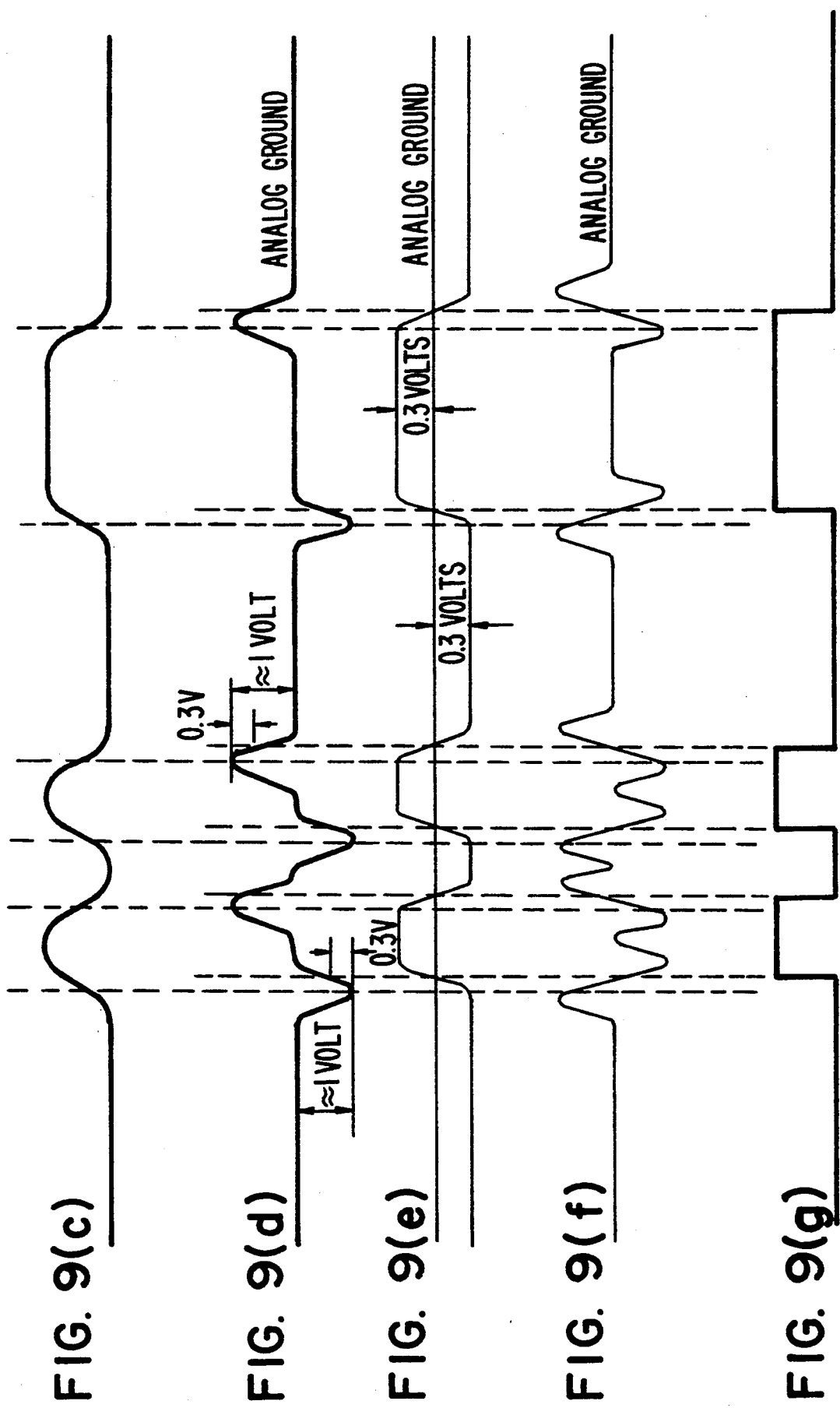

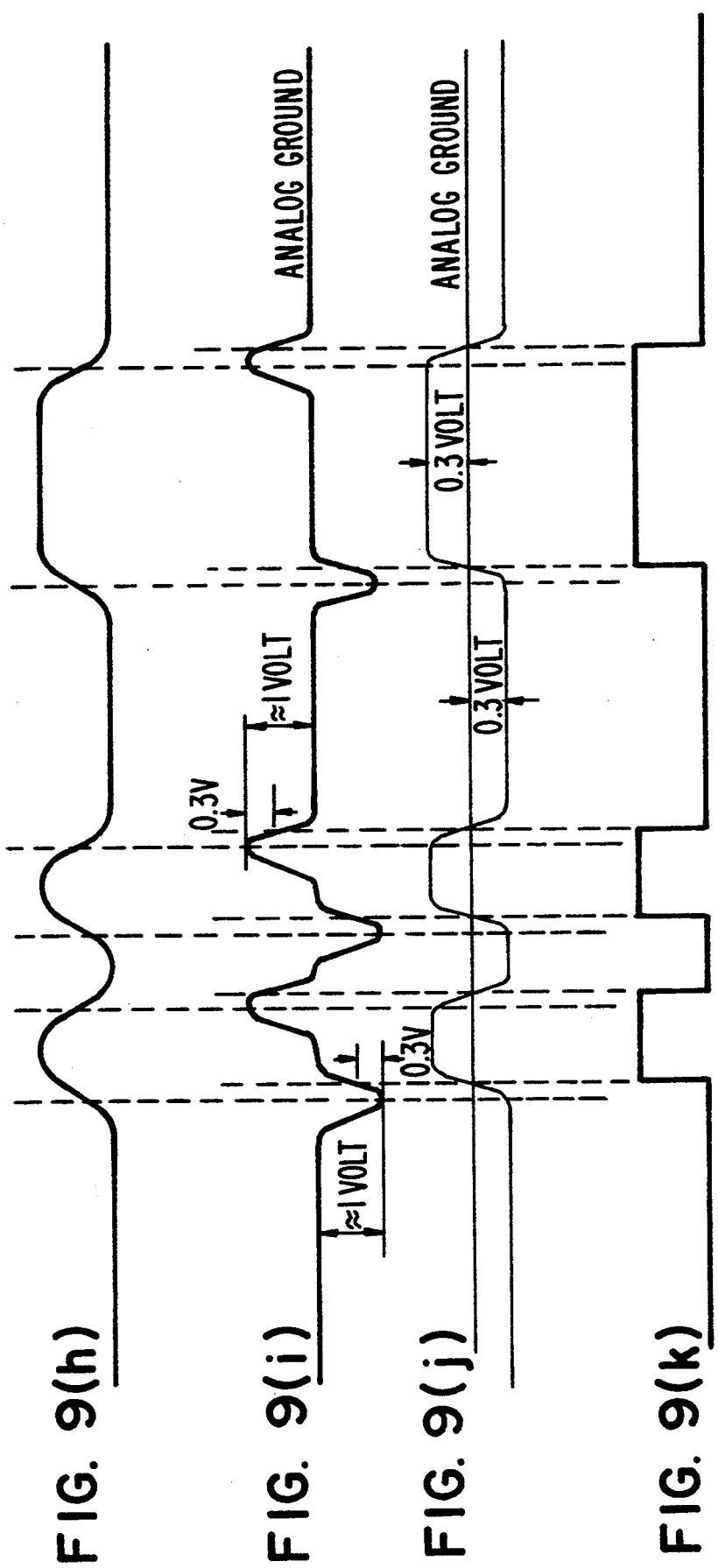

DIGITAL CIRCUIT FOR A LASER SCANNER USING A FIRST DERIVATIVE SIGNAL AND A COMPARISON SIGNAL

CROSS-REFERENCE TO RELATED APPLICATIONS

This application is a continuation-in-part of U.S. Ser. No. 721,951 filed Jun. 27, 1991, now abandoned, which is a division of Ser. No. 510,074, filed Apr. 13, 1990, now U.S. Pat. No. 5,059,779, which is a continuation-in-part of Ser. No. 367,335, filed Jun. 16, 1989, now U.S. Pat. No. 5,124,539.

BACKGROUND OF THE INVENTION

1. Field of the Invention

This invention generally relates to a hand-held laser scanner for scanning and reading coded indicia, e.g., bar code symbols, with a first scan pattern and, more particularly, to a stand-alone fixture for selectively supporting the laser scanner thereon and, when so supported, for converting the first scan pattern to a different, second scan pattern operative for scanning and reading indicia located exteriorly of the fixture. Furthermore, various digitizer circuits are disclosed for signal processing.

1. Description of Related Art

Hand-held laser scanners are well known. See, for example, U.S. Pat. Nos. 4,387,297; 4,409,470 and 4,806,742 as being representative of the art. A stand-alone laser scanning workstation, for example, see U.S. Pat. No. 4,369,361, having built-in laser, scanning and sensor components is also known.

It is known in this art to construct a digital signal from an analog signal generated from a photoelectric transformation of light reflected off a symbol during scanning by using signal processing digitizing circuits which either use fixed threshold levels derived directly from the analog signal, or which compare a first derivative of the analog signal to a peak signal that follows the peaks of the analog signal. However, such known digitizing circuits are susceptible to errors due to such factors as high ambient light levels and noise, especially in cases where the reading beam spot is poorly focused, i.e., in long-range reading applications, or in reading very high density symbols.

SUMMARY OF THE INVENTION

Accordingly, the present invention is directed to a signal processing digitizing circuit that addresses limitations and disadvantages of the prior art.

One advantage of the present invention is a digital processing digitizing circuit that resists noise, high ambient light levels, and poor focusing conditions, and still provides a true and faithful digital reconstruction of a symbol being scanned.

To achieve these and other advantages, and in accordance with the purpose of the invention, as embodied and broadly described, a circuit for digitizing an analog electric signal generated from a photoelectronic conversion of light reflected off scanning indicia having spatially-separated, light-reflective portions, comprises first differentiating means for differentiating the analog electric signal to generate a first differentiated signal; second differentiating means for differentiating the first differentiated signal to generate a second differentiated signal; comparator means for comparing the first and second differentiated signals to generate a digital electrical signal from the indicia being scanned; and output means for producing a digital output signal corresponding to the digital electrical signal.

In another aspect, a circuit for digitizing an analog electric signal generated from a photoelectronic conversion of light reflected off scanning indicia having spatially-separated, light-reflective portions, comprises differentiator circuit means for generating a first derivative signal representing a first derivative of the analog signal; means for generating a comparison signal which does not require additional derivatives of the analog signal; output means, coupled to the differentiator circuit means and to the generating means, for comparing the first derivative signal and the comparison signal to generate a digital output signal indicating a change in the intensity of the reflected light; and an output controller, coupled to the output means, for controlling passage of the digital output signal.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional view taken on line 2—2 of FIG. 1;

FIG. 3 is a sectional view taken on line 3—3 of FIG. 2;

FIG. 9($b$) is an electrical schematic diagram of an alternative embodiment of the digitizing circuit depicted in FIG. 9($a$);

FIGS. 9($c$)–9($g$) are waveforms at various locations in the circuit of FIG. 9($a$) ;

FIGS. 9($h$)–9($k$) are waveforms at various locations in the circuit of FIG. 9($b$);

DETAILED DESCRIPTION OF THE PREFERRED EMBODIMENTS

Figure 1:
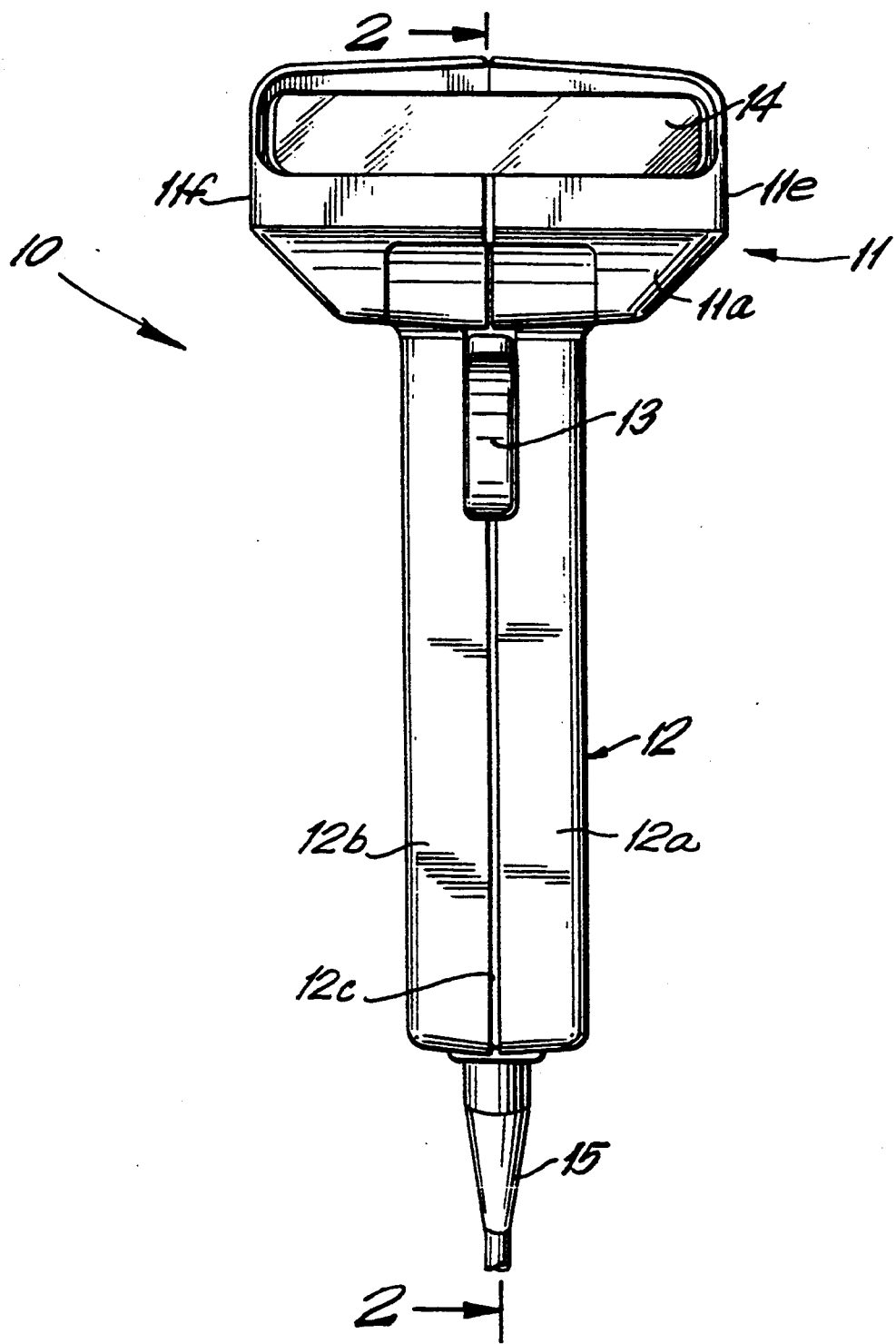
FIG. 1 is a front elevational view of a hand-held scanner.

Referring first to FIGS. 1–4 of the drawings, reference numeral 10 generally identifies a lightweight (less than one pound), hand-held laser scanner supportable entirely by a user for use in a laser scanning system operative for reading, scanning and/or analyzing coded indicia, and aimable both prior to, and during, the reading thereof, by the user at the indicia, each in its turn. The term "indicia" or "symbol", as used interchangeably herein, is intended to cover indicia composed of different portions having different light-reflective properties at the wavelength of the light source, e.g., a laser, being utilized. The indicia may be the omnipresent Universal Product Code (UPC) bar code symbol, or any of the black and white industrial symbols, e.g., Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the scanner 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the scanner conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the housing. The shell is formed of two housing parts 12a, 12b, meeting along a generally vertical joining line 12c.

Figure 4:
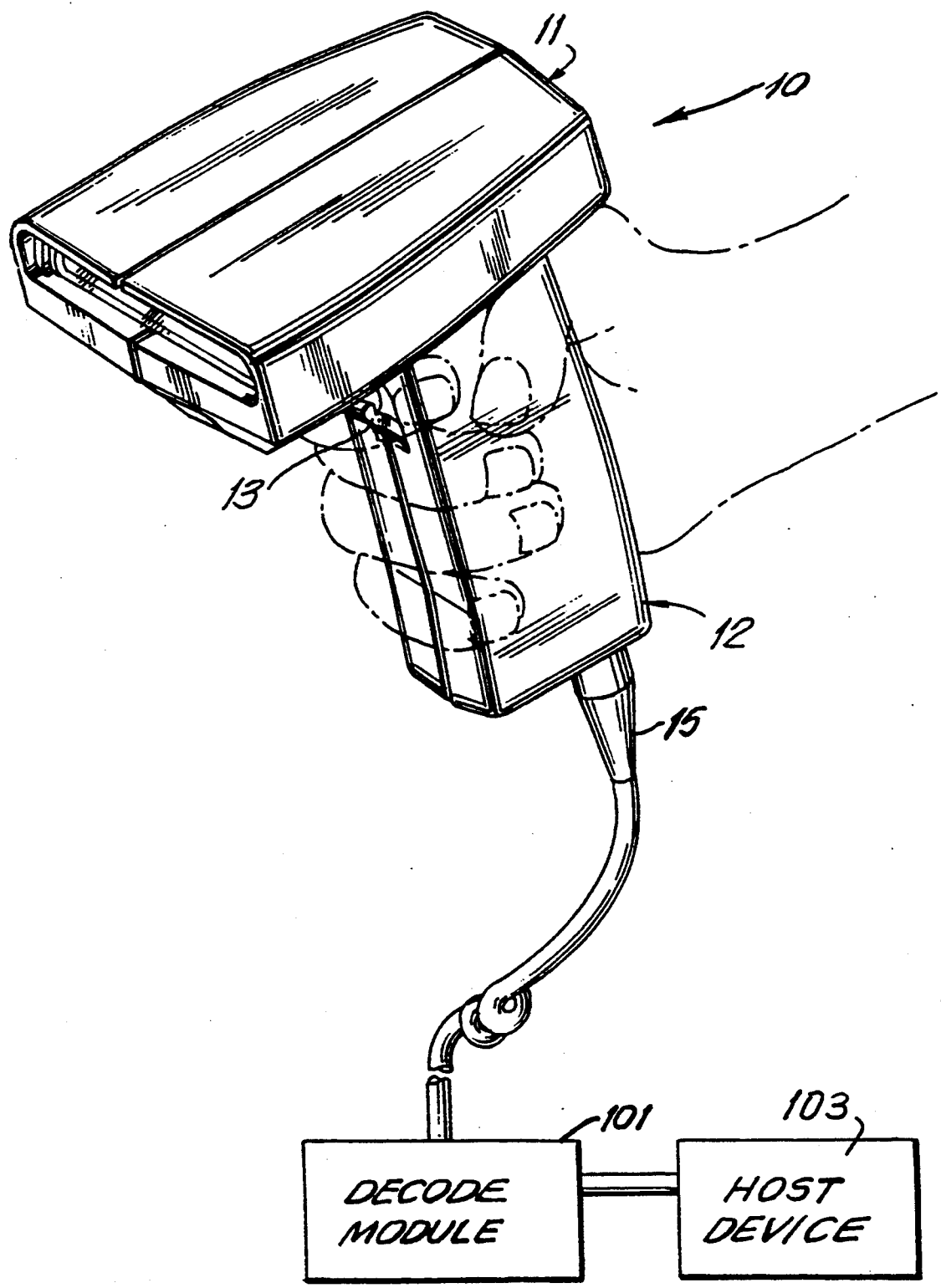
FIG. 4 is a perspective view of the scanner of FIG. 1 in one intended position of use.

As considered in one intended position of use, i.e. as a hand-held scanner as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the housing in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

An exit window 14 is stationarily mounted at the nose and is light-transmissive to allow laser light to pass from the interior to the exterior of the housing, and vice versa.

A flexible, non-bulky, coil-type electrical cable 15 with multiple freedoms of movement interconnects the scanner to the remainder of the components of the laser scanning system, whose operation is explained in greater detail below.

A plurality of components are mounted in the scanner and, as explained below, at least some of them are actuated by the trigger 13, either directly or indirectly, by means of a control microprocessor. One of the components is an actuatable laser light source (see FIG. 3), e.g., a semiconductor laser diode 33, operative, when actuated by the trigger 13, for propagating and generating an incident laser beam whose light is visible or at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section generally resembling an oval. The diode may be of the continuous wave or pulse type. The diode requires a low voltage (e.g., 12 v DC or less) supplied by a power regulator and a battery (DC) source which may be provided within the scanner, or by a re-chargeable battery pack accessory detachably mounted on the scanner, or by a power conductor in the cable 15 connected to the scanner from an external power supply (e.g., DC source).

In the prior art, analog signals do not have well-defined points indicative of each transition from a bar to a space, or vice versa, of a bar code symbol. The analog signal is characterized by gradually rising slopes which reach an amplitude peak and, thereupon, by gradually falling slopes which drop off from each peak. In such prior art signal processing circuits as described, for example, in U.S. Pat. No. 4,251,798, the analog signal itself was directly used to obtain maximum and minimum fixed threshold levels from which symbol transitions were determined. However, high ambient light levels adversely affected symbol reconstruction.

It was also proposed in such prior art as disclosed in U.S. Pat. No. 5,061,843 to utilize the first derivative of the analog signal and to utilize a peak detector in converting the analog signal to a digital signal. However, in certain situations where the reading spot was poorly focused, i.e., outside its depth of focus, for example, during long range scanning, it is insufficient to compare the first derivative signal with the peak detected signal. The peaks of the first derivative signal vary in amplitude, and very low amplitude peaks were not detected, thereby leading to errors in symbol reconstruction.

Figure 5:
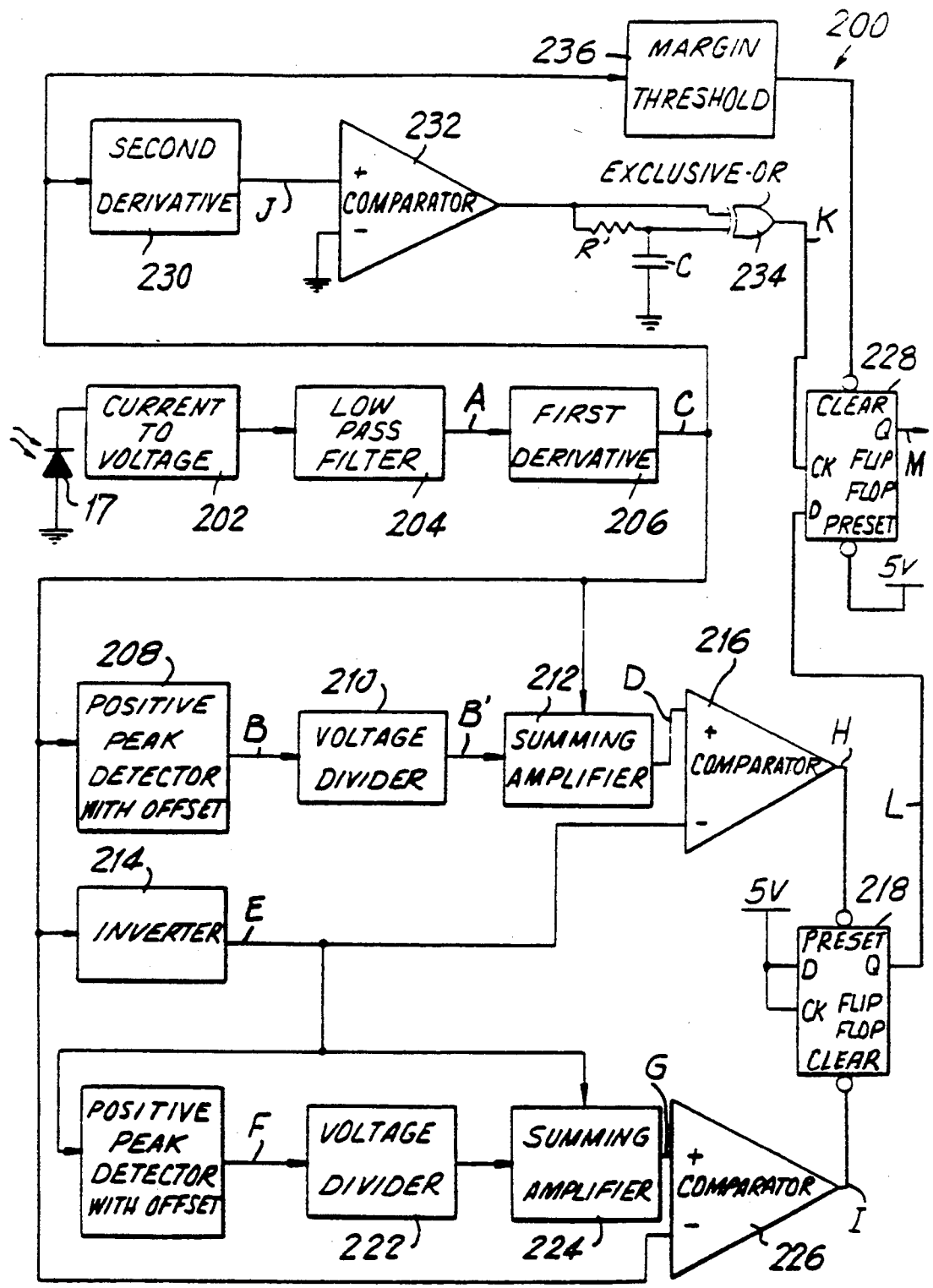
FIG. 5 is a block diagram of one embodiment of a signal processing digitizing circuit in accordance with this invention.
Figure 6:
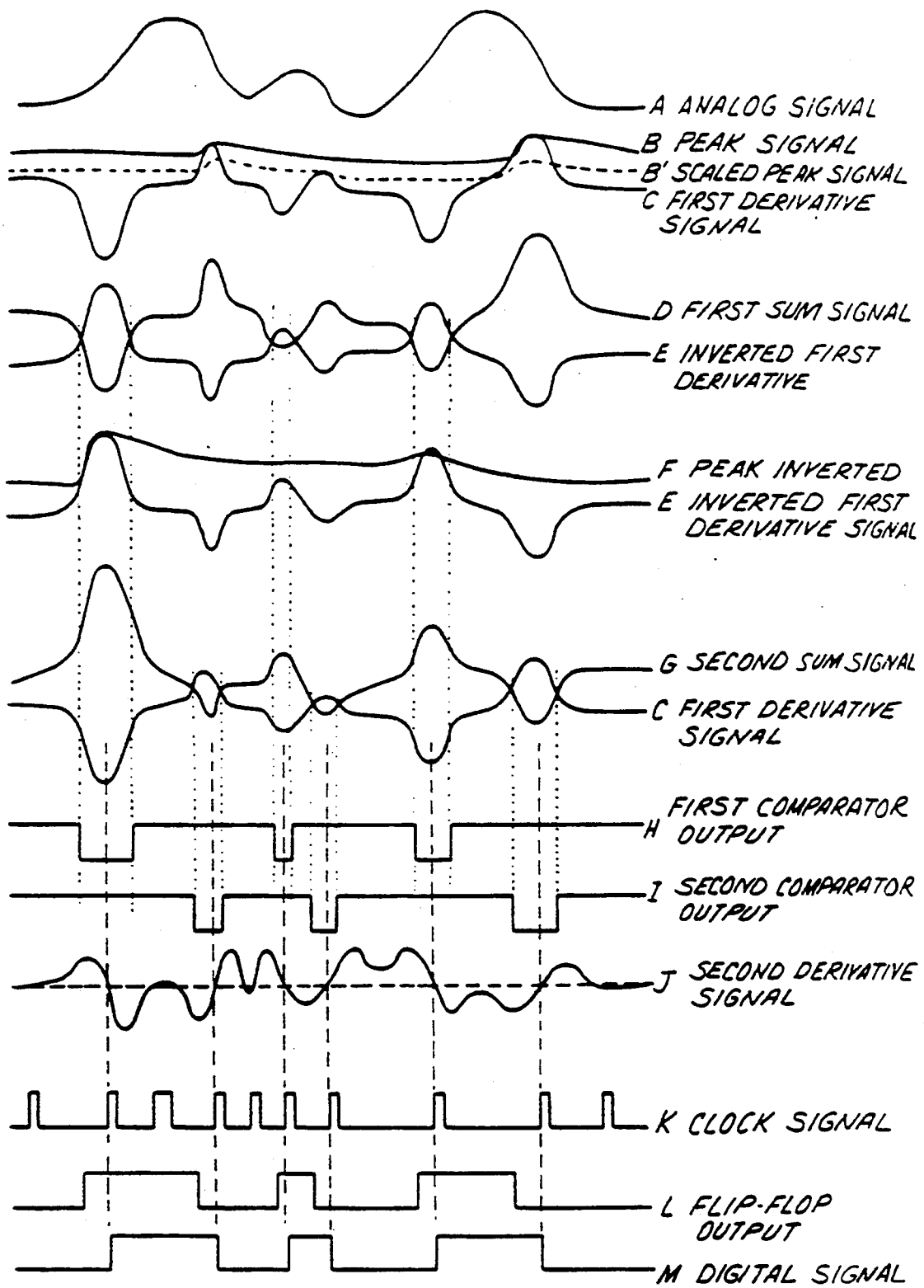
FIG. 6 is a set of waveforms at various locations in the circuit of FIG. 5.

FIG. 5 depicts a signal processing circuit 200, and FIG. 6 depicts voltage waveforms at various locations in circuit 200. Circuit 200 includes a current-to-voltage converter 202 operative for converting the variable electric current generated by photosensor 17 during scanning of a symbol to a voltage. The variable voltage is then filtered by low pass-filter 204, thereby resulting in a filtered analog voltage signal (waveform A).

First differentiator 206 generates a first voltage signal (waveform C). The amplitude peaks of the first derivative signal closely approximate the true edge locations of the original bar code symbol. A positive peak detector 208 generates a peak signal poorly focused situations, certain peaks of the first derivative signal are very low in amplitude and are not picked up by the peak signal. Hence, as a first corrective measure, the peak signal is scaled down in voltage, typically by 50%, by a voltage divider 210. This scaled-down peak signal is depicted in dashed lines in FIG. 6 as the waveform B'.

A summing amplifier 212 adds the first derivative signal (wave form C) and the scaled-down peak signal (waveform B') to obtain a first sum signal (waveform D). An inverter 214 inverts the first derivative signal (waveform C) to obtain an inverted derivative signal (waveform E). The first sum signal (waveform D) and the inverted derivative signal (waveform E) are then compared in a comparator 216 to obtain a first comparator output signal (waveform H). The comparator output signal is comprised of pulses whose leading and trailing edge transitions are defined each time that waveforms D and E intersect. These transitions are conducted to the "Preset" input terminal of a flip-flop 218, and preset the flip-flop to a binary high logic level "1", thereby indicating positive-going edges.

To obtain the transitions that indicate negative-going edges, the inverted first derivative signal (waveform E) is conducted to another positive peak detector 220 to generate a peak inverted signal (waveform F). As before, a voltage divider 222 scales down the peak inverted signal, and this scaled-down signal is then summed, together with the inverted first derivative signal, in another summing amplifier 224 to generate a second sum signal (waveform G). The second sum signal (waveform G) and the first derivative signal (waveform C) are compared in another comparator 226 to obtain a second comparator output signal (waveform I) which, in turn, is conducted to the "Clear" terminal of the flip-flop 218 to provide the transitions indicative of the negative-going edges that clear the flip-flop 218. The flip-flop 218 generates an output signal (waveform L) which stores a binary high logic level "1" when each positive-going edge is detected, and a binary low logic level "0" when each negative-going edge is detected. This output signal (waveform L) is conducted to the data "D" terminal of another flip-flop 228.

A second differentiator 230 generates a second derivative signal (waveform J) which is fed to one input of a comparator 232 whose other input is grounded. The comparator output is fed through an R-C time delay circuit, and an exclusive OR gate to generate a clock signal (waveform K) in which a pulse is generated every time the second derivative signal (waveform J) passes through zero, i.e., every time the comparator 232 changes from one state to another.

The clock signal (waveform K) is conducted to the clock "Ck" terminal of the flip-flop 228 and, together with the output signal (waveform L) supplied by the flip-flop 218, causes the flip-flop 228 to generate an output digital signal (waveform M). The clock signal is used to clock the flip-flop 228 and to latch the edge direction stored in the flip-flop 218. In this manner, the true bar code edges are reconstructed from the analog signal. A margin threshold subcircuit 236 is used to clear the flip-flop 228, and its operation is described below in connection with FIGS. 9(a), 9(b) or FIG. 10.

Figure 7:
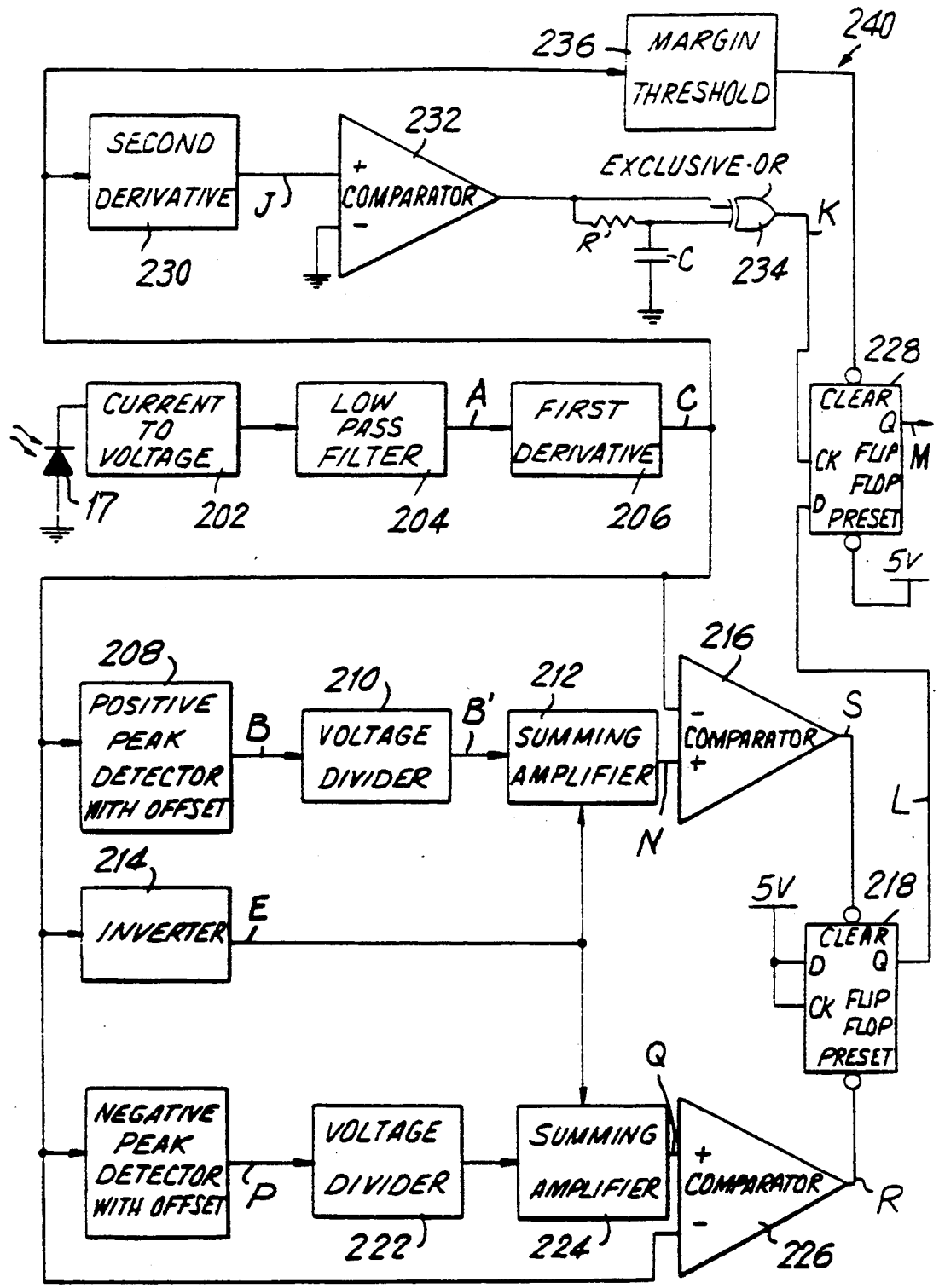
FIG. 7 is a block diagram of another embodiment of a signal processing digitizing circuit in accordance with this invention.
Figure 8:
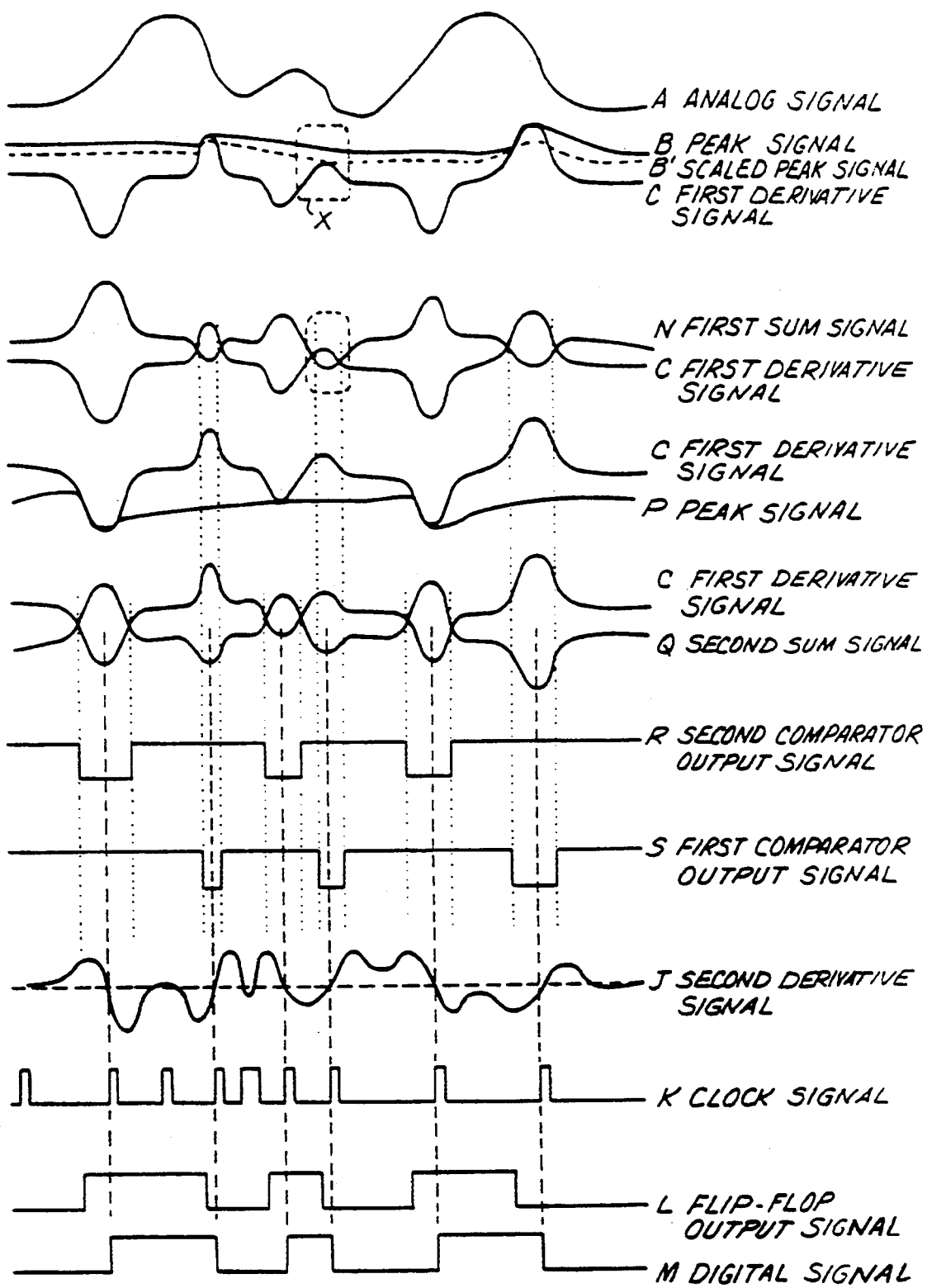
FIG. 8 is a set of waveforms at various locations in the circuit of FIG. 7.

Turning now to FIGS. 7 and 8, another embodiment of a signal processing circuit 240 is depicted together with explanatory waveforms. Like reference numerals identify like components. The converter 202, filter 204, differentiator 206, positive peak detector 208, voltage divider 210, summing amplifier 212 and inverter 214 are operative, as described above, to generate the waveforms A, B, B', C and D. In a departure from circuit 200, the summing amplifier 212 generates a first sum signal (waveform N) which is the sum of the scaled-down peak signal (waveform B') and the inverted first derivative signal (waveform E). The comparator 216 compares the first sum signal (waveform N) with the first derivative signal (waveform C) to generate a first comparator output signal (waveform S) which is conducted to the "Clear" terminal of the flip-flop 218. The transitions of the first comparator output signal clear the flip-flop 218 to a binary low logic level "0", thereby indicating each negative-going edge.

To obtain transitions that indicate positive-going edges, a negative peak detector 238 detects the negative peaks of the first derivative signal (waveform C) to generate a negative peak signal (waveform P). A voltage divider 222 scales down the negative peak signal. A summing amplifier 224 sums this scaled-down signal with the inverted first derivative signal to obtain a second sum signal (waveform Q). The second sum signal and the first derivative signal are compared in the comparator 226 to generate a second comparator output signal (waveform R) which is then conducted to the "Present" terminal of the flip-flop 218. The transitions of the second comparator output signal (waveform R) indicate positive going edges. The flip-flop 218 generates an output signal (waveform L) wherein a binary high logic level "1" is stored by the flip-flop 218 when a positive going edge is detected, and stores a binary low logic level "0" when a negative going edge is detected.

As before, a second differentiator 230 generates a second derivative signal (waveform J) and a clock signal (waveform K) that is fed to the clock "Ck" terminal of the flip-flop 228 whose output digital signal (waveform M) is a digital reconstruction of the symbol.

Hence, rather than using fixed threshold levels derived directly from the analog signal, or comparing the first derivative signal to a peak signal as was done in the prior art, this invention compares the first derivative signal to the sum of the peak signal plus an inverted version of the first derivative signal. Hence, added performance is gained, especially when the contrast levels of the analog signal are low. For example, as shown in the region X in FIG. 8, the contrast level of the analog signal is low. Sometimes the peak signal fails to cross under the peak of the first derivative signal, thereby leading to poor symbol reconstruction.

Figure 9A:
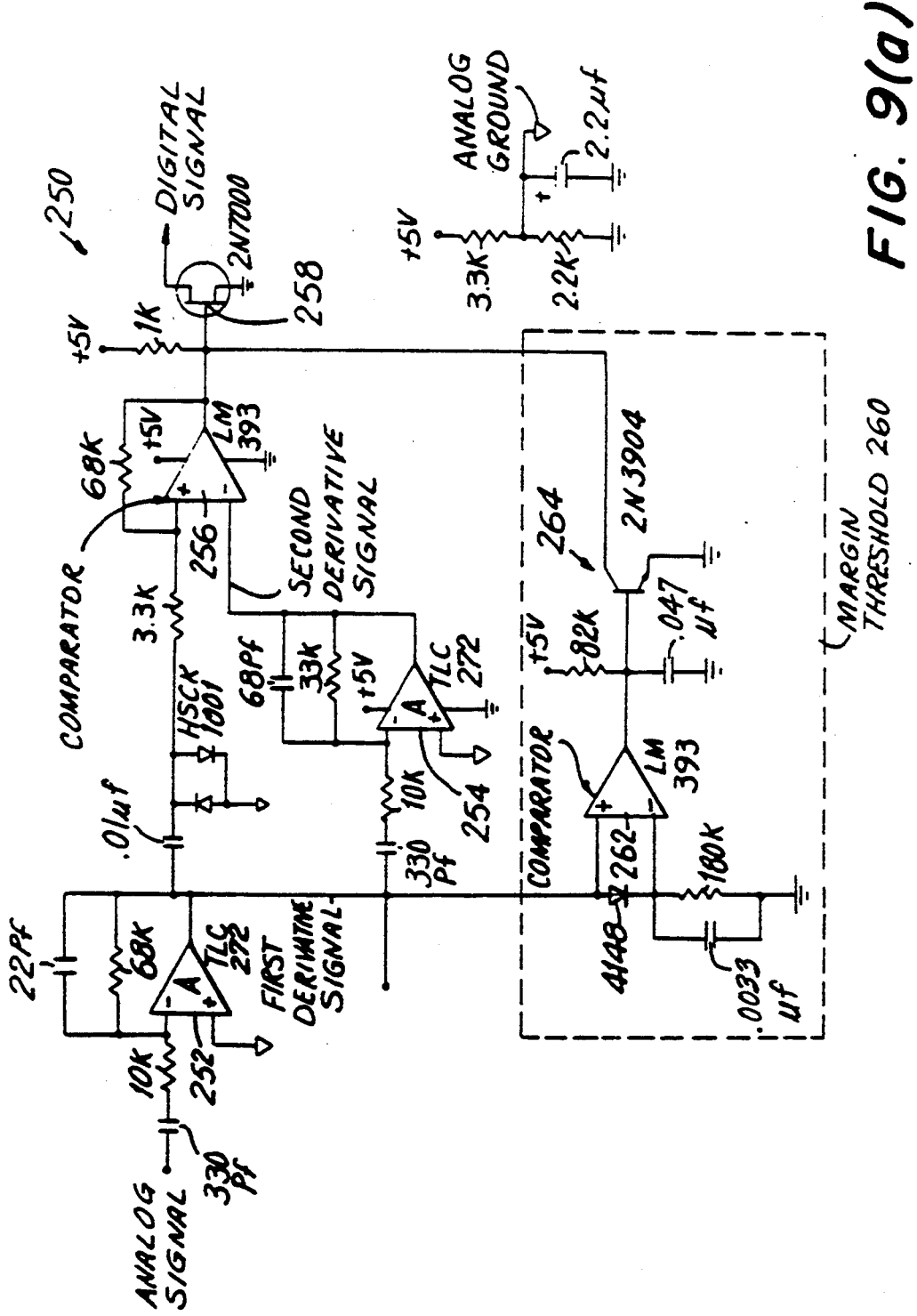
FIG. 9($a$) is an electrical schematic diagram of still another embodiment of a signal processing digitizing circuit in accordance with this invention.

A simplified digitizing circuit 250 is depicted in FIGS. 9(a) and (b), and provides good digitizing accuracy even when the reading beam spot is much larger than the narrowest bars or spaces in the symbol being scanned. This makes it particularly good for use in long-range scanners, scanners for reading very high-density symbols, or scanners that are to be used where a large depth of focus is important. The digitizing circuit 250 can also provide excellent immunity to high levels of ambient light, including sunlight.

In FIG. 9(a), the analog signal is initially conducted to a first operational amplifier 252, preferably positioned early in a chain of amplifiers, configured as a differentiator to generate a first derivative signal. A second operational amplifier 254 configured as a differentiator is operative to generate a second derivative signal. A passive differentiator could be used here for simplicity. The first and second derivative signals are conducted to the pair of inputs of a comparator 256 whose digital output is conducted to a transistor 258.

Figure 9B:
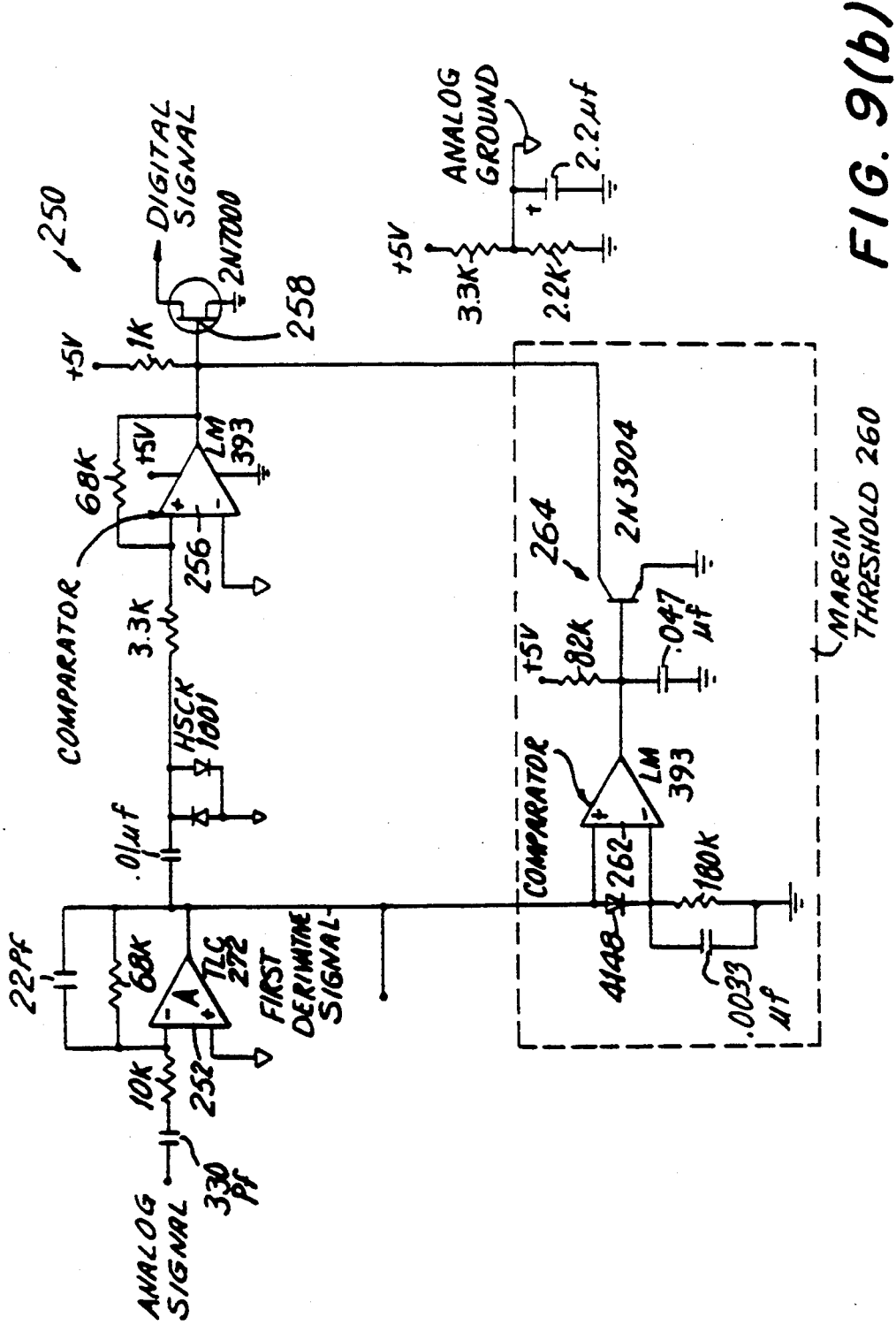

A margin threshold subcircuit 260 includes a comparator 262, one input of which is supplied with the first derivative signal, and the other input of which is grounded. In particular, the noninverting input is supplied with the first derivative signal. As shown in FIG. 9(a) or 9(b), the diode (1N4148), which has a forward voltage drop of 0.7 V, provides a signal that is 0.7 V below the first derivative signal for the inverting input of the comparator 262. The diode prevents the two inputs of the comparator 262 from crossing due to noise on the first derivative signal that is less than 0.7 V. The output of comparator 262 is conducted to the base of a transistor 264 whose collector is connected to the output of the comparator 256. Accordingly, the margin threshold circuit 260 gates off the output of the digitizer circuit 250 when the amplitude of the first derivative signal is less than 0.7 V to allow a digitized bar pattern with clean margins.

A set of waveforms corresponding to various points of FIGS. 9(a) are shown in FIGS. 9(c)–9(g). FIG. 9(c) shows an analog signal corresponding to the bar code. The analog signal is applied to operational amplifier 252 and converted to a first derivative signal, as shown in the waveform of FIG. 9(d). The first derivative is applied to operational amplifier 254 a second derivative signal of the analog signal is generated, as shown in the waveform of FIG. 9(f).

The first derivative signal is also applied to a clamping circuit including 0.01 μf capacitor and a clamping diode (HSCK 1001, for example), which clamps the first derivative signal to a set voltage above and below the analog ground (0.3 volt, for example). FIG. 9(e) shows the waveform produced from the clamping circuit which is applied to the non-inverting input of the comparator 256. The second derivative signal from operational amplifier 254 is applied to the inverting input of the comparator 256. The FIG. 9(g) shows the output of the comparator 256.

FIG. 9(b) is another embodiment of the digitizing circuit 250 shown in FIG. 9(a). In the digitizing circuit of FIG. 9(b), the inverting input of comparator 256 is tied to an analog ground instead of a second derivative signal as in FIG. 9(a). Hence, the comparator 256 compares the clamped signal from the clamping circuit to analog ground to produce the output signal. The remaining portions of the embodiment of FIG. 9(b) is identical to FIG. 9(a).

The margin threshold circuit 260 of FIG. 9(b) may be identical to the margin threshold circuit of FIG. 9(a).

A set of waveforms corresponding to various points of FIGS. 9(b) are shown in FIGS. 9(h)–9(k). FIGS. 9(h)–9(k) are similar to FIGS. 9(c)–9(g) except that FIGS. 9(h)–9(k) does not include a second derivative signal of the analog signal because the comparator 256 of FIG. 9(b) compares the waveform of FIG. 9(j) to the analog ground.

Figure 10:
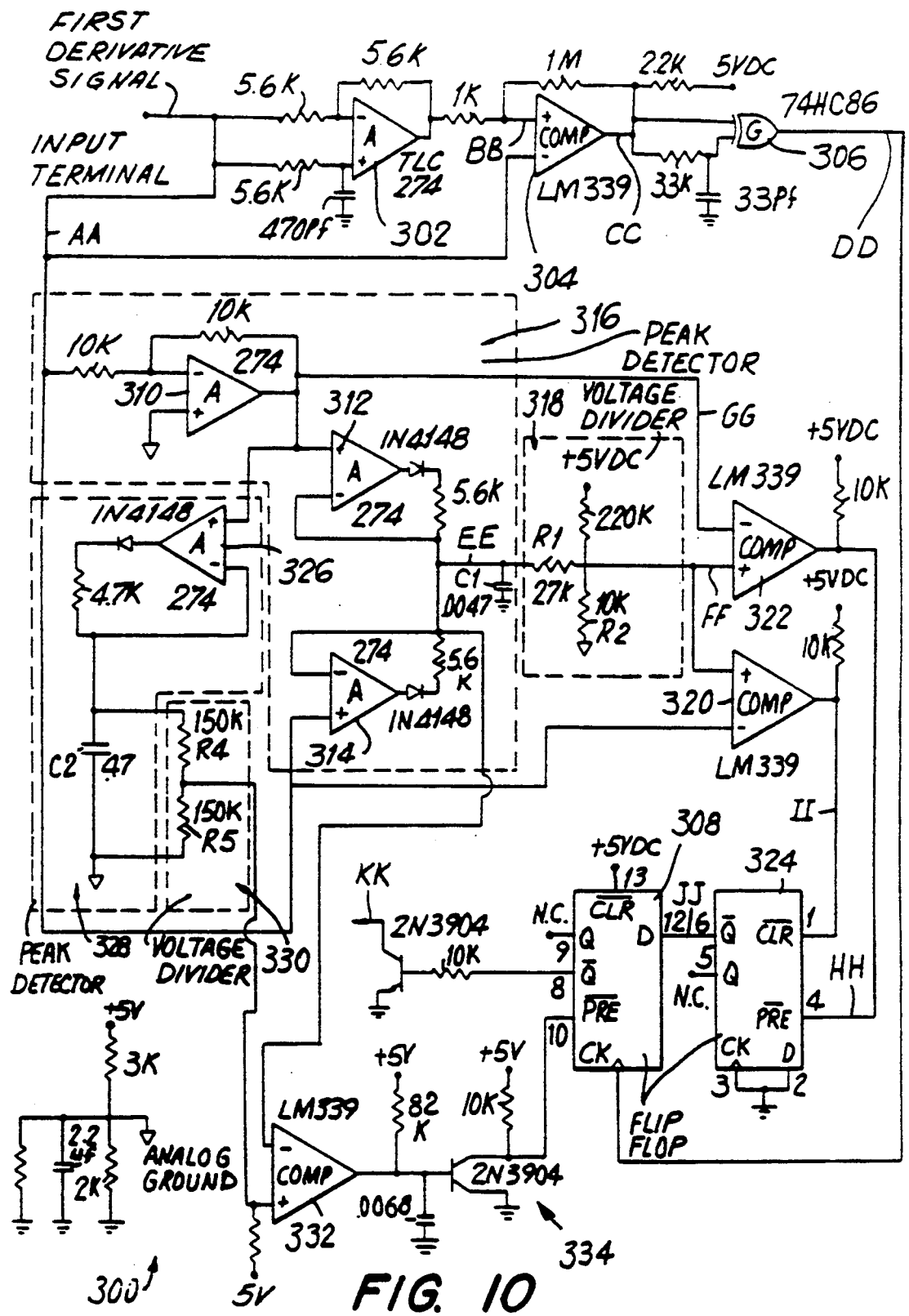
FIG. 10 is an electrical schematic diagram of yet another embodiment of a signal processing digitizing circuit in accordance with this invention.
Figure 11:
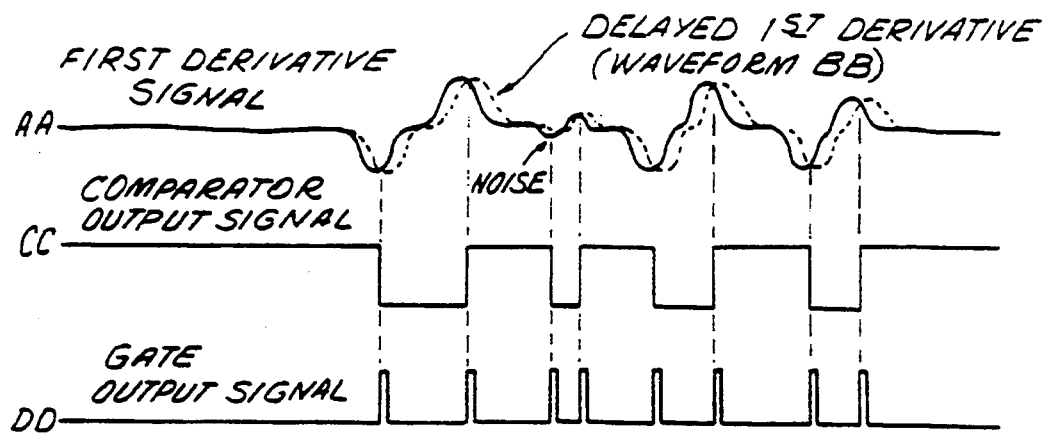
FIG. 11 is a set of waveforms at various locations in the circuit of FIG. 10.
Figure 11:
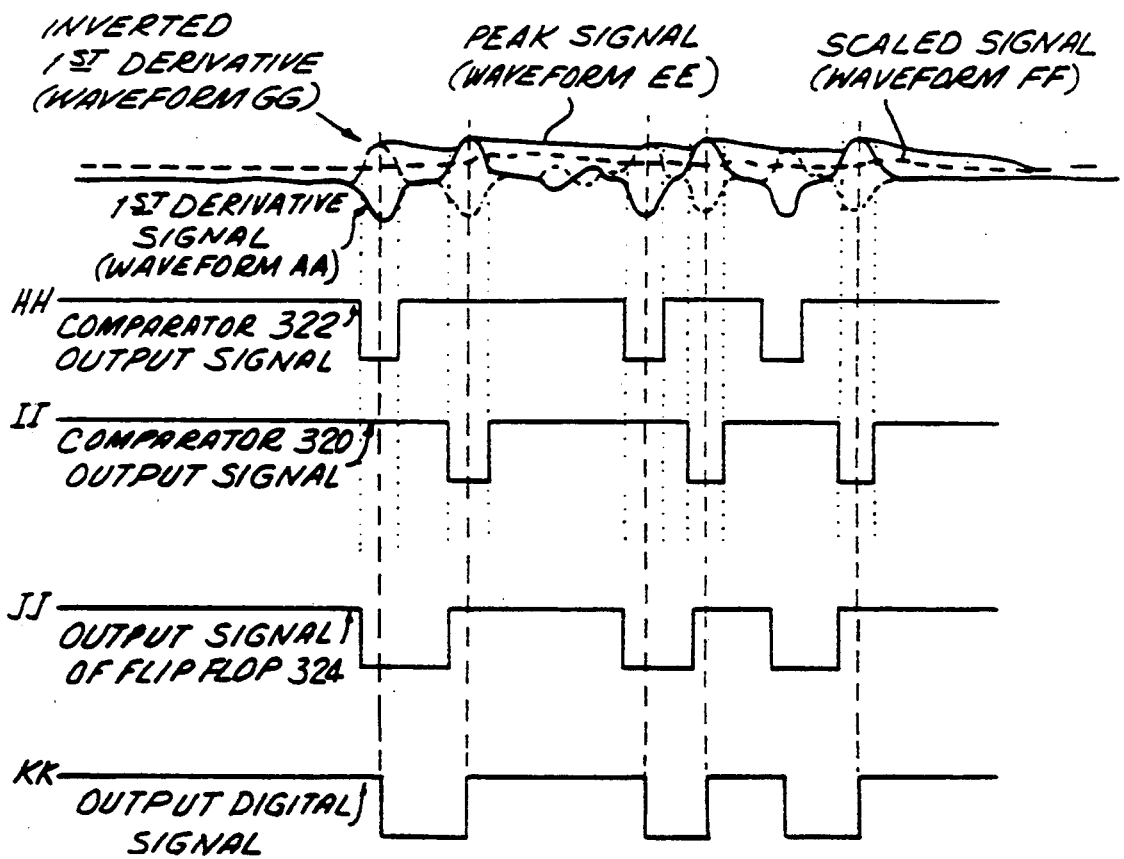

Another signal processing digitizing circuit 300 is set forth in FIG. 10 with explanatory waveforms depicted in FIG. 11.

A non-illustrated differentiator generates a first derivative signal of the analog signal. This first derivative signal (waveform AA) is applied to an input of the circuit 300. The signal polarity is such that negative peaks represent white-to-black transitions, and positive peaks represent black-to-white transitions, of the bar code symbol being scanned with light.

Operational amplifier 302 is operative to slightly delay the first derivative signal. The delayed first derivative signal is depicted in FIG. 11 by dashed lines as waveform BB. A comparator 304 compares the delayed first derivative signal (waveform BB) to the undelayed first derivative signal (waveform AA), and generates a comparator output signal (waveform CC).

Gate 306 generates a gate output signal (waveform DD) having a pulse at each rising and each falling transition at the output of comparator 304. The gate output signal (waveform DD) is then conducted to the clock "Ck" terminal of a flip-flop 308.

Operational amplifiers 310, 312, 314 together form a full wave peak detector 316, which causes capacitor C1 to be charged to the absolute value of the peaks of the first derivative signal. Capacitor C1 discharges through resistors R1 and R2. This peak voltage is displayed in FIG. 11 as waveform EE.

The voltage at the node between resistors R1 and R2 is a percentage of the voltage across capacitor C1 and, with the value shown, is about 27%. The resistors R1 and R2 serve as a voltage divider 318. The scaled-down voltage signal is depicted in FIG. 11 as waveform FF.

Comparator 320 compares this scaled-down peak signal (waveform FF) to the first derivative signal (waveform AA). Comparator 322 compares the same scaled-down peak signal (waveform FF) to an inverted version (waveform GG) of the first derivative signal. The inversion is performed by the amplifier 310. The output signal (waveform HH) of comparator 322 is connected to the "Present" terminal of a flip-flop 324. The output signal (waveform II) of the comparator 320 is connected to the clear "Clr" terminal of the flip-flop 324.

As shown by waveform JJ, which is the output signal of the flip-flop 324, the flip-flop 324 flips to one state whenever positive peaks of the first derivative signal (waveform AA) exceed a percentage of the voltage on capacitor C1, the percentage being determined by the ratio of resistors R1 and R2. Flip-flop 324 flips to the other state when the positive peaks of the inverted first derivative signal (waveform GG) exceed the same percentage of the voltage on capacitor C1. Peaks on the first derivative signal (waveform AA) that do not exceed the percentage voltage are not sensed by the comparator 322 or by the comparator 320, and do not change the state of flip-flop 324. This prevents circuit 300 from responding to noise.

The output of flip-flop 324 is connected to the data "D" terminal of flip-flop 308. This causes the output of flip-flop 308, as shown by its output digital signal (waveform KK) to change state only upon the first pulse into its clock input after flip-flop 324 changes its state. Additional clock pulses, such as those caused by noise, are ignored. The gate output signal (waveform DD) occurs only at peaks of the first derivative signal as described above. Therefore, flip-flop 308 only changes its state when the first peak after the transition of flip-flop 324 occurs. The output digital signal (waveform KK) has transitions that accurately correspond to the peaks of the first derivative signal, except, of course, for the noise peaks which are ignored.

Resistor R3 in the voltage divider 318 prevents the peak detector 316 from discharging all the way to zero when there is no bar code symbol or other graphics being scanned. This keeps circuit 300 from responding to low level noise.

Operational amplifier 326 is used in another peak detector circuit 328, and charges capacitor C2 to the positive peak level of the inverted first derivative signal (waveform GG). These peaks correspond to the white-to-black transitions of the analog signal. Capacitor C2 is slowly discharged through resistors R4 and R5 which are part of another voltage divider 330. The resultant time constant is long enough so that capacitor C2 does not totally discharge between scans. The voltage at the node between resistors R4 and R5 is, with the values shown, one-half of the voltage of capacitor C2.

Another comparator 332 compares the voltage at the node between resistors R4 and R5 with the voltage out of the full wave peak detector. If a symbol is being scanned, the output of the full wave peak detector will be higher than the voltage at the other input of the comparator 332. This will cause the output of the comparator 332 to be low.

Shortly after the scanning spot moves off the last bar of the symbol being scanned, the capacitor C1 discharges until it has less than half of the voltage of capacitor C2. This causes the output of the comparator 332 to go high, thereby turning on a transistor 334. The output of transistor 334 is connected to the preset "PRE" terminal of the flip-flop 308, and presets the flip-flop 308, thereby insuring that the latter is in the proper state for the next scan to start. This also increases the immunity of the circuit 300 to noise between scans, as it prevents the flip-flop 308 from responding to anything that has an amplitude that is less than that existing at the node between the resistors R4 and R5, and serves as a margin threshold subcircuit as, for example, identified above by reference numeral 236.

Figure 12:
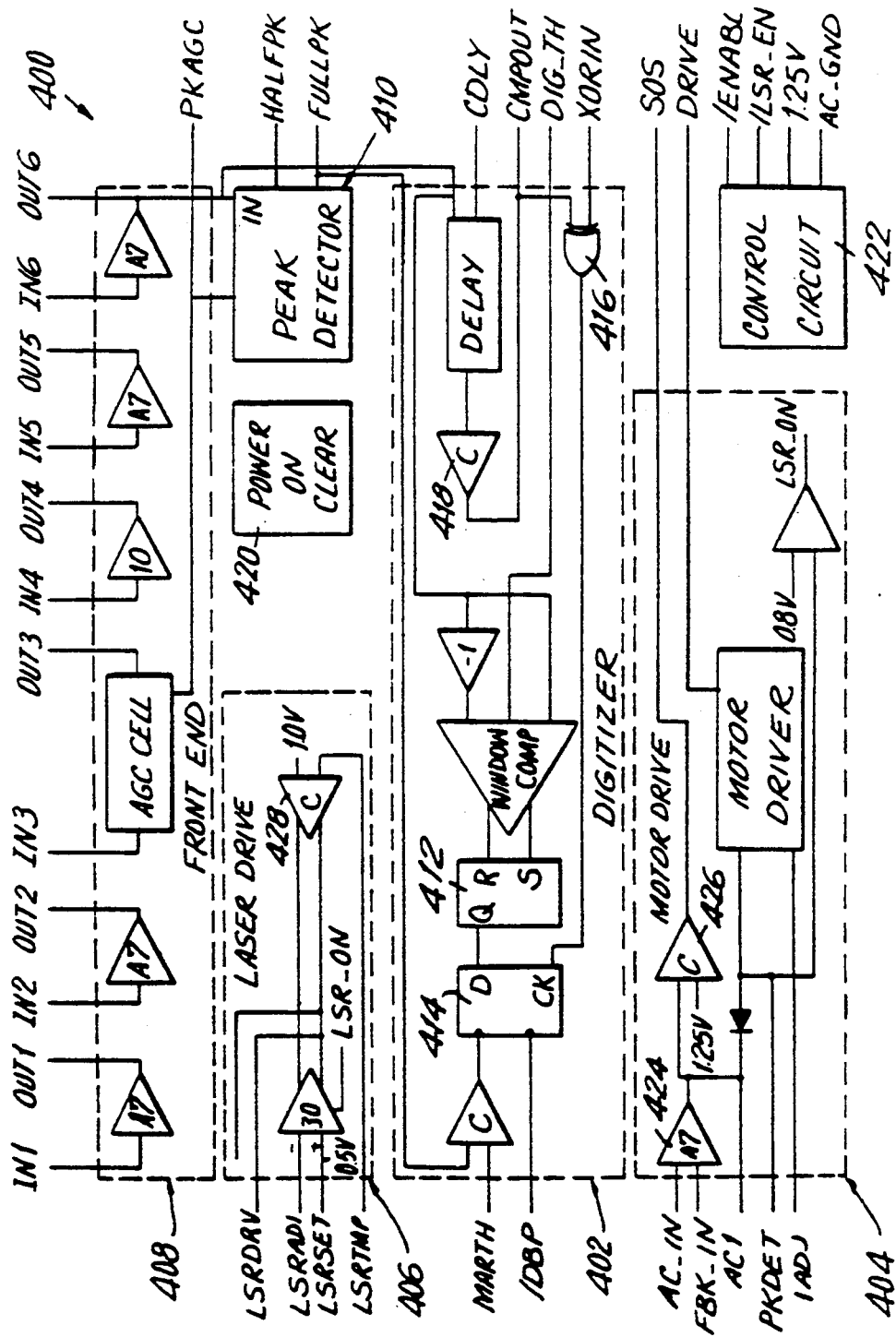
FIG. 12 is a block diagram of an integrated circuit chip on which a digitizer circuit is incorporated.

FIG. 12 depicts a single chip custom linear circuit 400 that incorporates many functions, thereby achieving a high performance scanner with much fewer components. The chip 400 includes a digitizer 402, such as the signal processing circuits 38, 200, 240, 250, 300 of FIGS. 2, 5, 7, 9 and 10, respectively; a motor drive circuit 404, such as identified by component 39 in FIG. 2; a laser drive circuit 406, such as identified by component 40 in FIG. 2; and a front end 408 including an automatic gain control circuit for controlling the gain (40 dB range) of the analog signal generated by the photosensor prior to being conducted to the digitizer circuit.

The front end 408 transforms the electrical current analog signal from the photosensor into a voltage signal, filters, amplifies and readies it for use by the digitizer. Conditioning of the signal includes proper amplification via the AGC cell as well as removal of noise and the effects of ambient light.

Total voltage gain is externally selectable and can be greater than 60 dB. Therefore, the current input node (IN1) is critically dependent on the integrated circuit as well as printed circuit board layout to minimize undesirable feedback and/or oscillation.

The equivalent input noise current and voltage of the first amplifier (IN1) is most critical since it determines the minimum detectable signal and therefore limits the dynamic range of the whole system. Layout which minimizes crosstalk for this first stage is paramount. Trenching, if at all possible, and techniques for limiting substrate currents are highly desirable.

Also important is that the input bias current of the AGC control input (PKAGC), be minimized to reduce drooping on the peak detector capacitor voltage between scans which is typically 27 msec. The capacitor is held to 1 $\mu$F or less for the purposes of maintaining fast AGC attack times and a physical size that is consistent with the scanner's application.

A peak detector 410 consists of a phase splitter/buffer input stage and two full wave and a single wave peak detector stage. The split buffered signal is used to feed the digitizer 402 as well as the peak detector's source followers. The peak detector's output transistors are capable of supplying the surge current needed to quickly charge the loading capacitor (as limited by the series resistors), and are also capable of withstanding the worst case reverse voltage (e.g., greater than 5 volts) without breaking down.

The peak detector 410 is used to feedback a control voltage signal for the AGC cell; to provide a signal tracking threshold for the digitizer's window comparator; and to feed signal status information to the digitizer's MARGIN circuit, in those applications where the AGC cell is not used.

The digitizer 402 is the heart of the scanner. It is here that the conditioned analog signal is analyzed and broken down to create the electronic equivalent of the bar code symbol being read. One branch of the digitizer is a window comparator with a variable threshold.

The threshold tracks the analog signal's amplitude, to maintain the highest possible signal-to-noise ratio for all possible amplitudes.

Such provision allows highly accurate reads every single scan, when the signal levels are high enough, but will adapt itself for a lower signal-to-noise ratio, for those times when the signal is feeble and a few scans might be required to obtain a read.

The output pulses of the window comparator are used to trigger the SET (S) and RESET (R) inputs of a flip-flop 412, thus producing a square wave that is representative of the symbol being read. For precise timing information (i.e., phase), an additional D-type flip-flop 414 is used and is clocked from the output of the exclusive-OR gate 416 which is part of a delay loop branch of the digitizer. The delay loop is used to extract timing information from the incoming signal so that phase distortion due to transitional speed and circuit response variation is virtually eliminated. It works by first delaying the signal and then feeding it and its delayed self to the two inputs of a comparator 418 with a properly selected amount of hysteresis.

The amount of the delay is selected so that the signal and its delayed version cross (and therefore cause the comparator to change state) at a point near the peaks, thus providing a degree of noise immunity higher than that possible at the zero crossing transitions, which yields less overall phase distortion.

The first derivative of the square wave so generated at the output of the comparator 418 is then fed to the exclusive-OR gate 416 (which is nothing more than another window comparator with fixed thresholds), the output of which is then used to clock the symbol data out of the D-type flip-flop 414, with a greater degree of phase integrity than would otherwise be possible.

The comparator 418 has the most demanding requirements for this subcircuit, because it must respond to signals whose peak amplitude is as low as 50 mV. The comparator 418 changes states very close to signal peaks and allows for as much as 15 mV of hysteresis. Hence, the gain and bandwidth must be as large as possible (135 dB of DC gain; 85 dB at 2 MHz and 0 dB at 43 MHz are preferred values under conditions of 5 V when biased for low frequency mode).

A response delay of no more than 600 nsec for 10 mV overdrive under the conditions of low frequency mode bias is needed, with 300 nsec desirable.

The difference between rise time delay and fall time delay (at 10 mV overdrive) must be less than 450 nsec for the low frequency mode bias and 250 nsec for the high frequency mode bias to maintain phase distortion within tolerable limits. Delay difference of less than 100 nsec is highly desirable for both conditions.

The output stage of the comparator must be capable of swinging to within 1 V from each rail as a minimum when driving a load of 16K ohms (the input impedance of the gate 416 is 20K ohms ±20%).

The gate 416 output pulse width must be a minimum of 1.5 μsec as measured at the halfway point, for all conditions (worst case is low frequency mode) when the gate common input (XORIN) is coupled to the comparator output via a 15 pF to 22 pF capacitor. For adequate noise immunity the gate thresholds are set 250 mV above and below the common input DC level of 1 V.

The D-type flip-flop 414 must be capable of clocking data when the clock pulse width is 1.5 μsec.

The power-on clear circuit 420 is used to clear the flip-flop and avoid overcharging of the peak detector's capacitors when power is first applied. This operation is necessary to insure that a decode is possible for the very first scan.

The power-on clear circuit 420 works by sensing the rail and the heavily bypassed AC GROUND hub. Its output is active until the voltage at AC GROUND reaches the value of 1 Vbe, at which point it becomes inactive, thus releasing the peak detector and flip-flop 414 for proper operation.

The control circuit 422 commands the whole chip operation. The way it does so is by generating all reference voltages and the AC GROUND used by all subcircuits.

Two input control lines are designed to allow open collector or CMOS drives. One input (/ENABL) activates a 1.25 V bandgap reference which, in turn, activates all subcircuits except the laser drive. When this one input has a high voltage, the circuit is disabled and draws a maximum of 100 μA (e.g., SLEEP MODE).

A low voltage applied to the other input (LSR.EN) enables the laser drive subcircuit 406 which requires that a low voltage be applied to /ENABL input, as well, for operation.

The motor drive circuit 404 is not interactive with any of those discussed thus far, except for the control circuit 422 which provides the 1.25 V reference.

When first powering up, the output of a sensing amplifier 424 rises towards the AC GROUND voltage level (its rest state). This transition is coupled to the input of a driving amplifier 426 via an external capacitor.

The initial surge provides the initial kick that gets the motor started. Once started, a sensing coil will provide the induced EMF to the sensing amplifier which then commands the driving amplifier to provide the regenerative drive to the motor coil. The motor acts as a high Q feedback element to control the oscillating frequency.

The output of the driving amplifier is used to drive a start-of-scan (SOS) external comparator which changes state every time the signal crosses zero.

The laser drive circuit 406 consists mainly of an operational amplifier, whose inputs are low-pass filtered to prevent high frequency noise (e.g., RF, EMI) from being integrated by the amplifier and damaging the laser by overdriving it.

This amplifier also has two outputs. One can source up to 5 mA of current to be used to drive an external drive that drives the laser, but can only swing to within one volt from Vcc.

A second one, which can only source or sink 60 μA, is used to drive an external FET that drives the laser and is capable of swinging to within 250 mV from each rail.

The LSRADJ input is used for the dual purpose of trimming the laser current via an external potentiometer to ground and also for sensing the feedback current from the photosensor. This allows the laser current to be set and continuously regulated. The laser drive circuit 406 is shut down when any one or all of the following conditions are met:

(a) Over intensity condition;
(b) Motor failure condition;
(c) Over temperature condition;
d) A logic high signal applied at the LAS.EN terminal.

An over intensity condition is sensed via the laser diode's internal monitor photosensor (which also provides continuous regulation) by direct connection into the amplifier feedback loop at the LSRADJ input terminal.

A motor failure condition is controlled by the motor drive circuit and shuts down the laser if the motor fails to swing above a predetermined swing amplitude.

An over temperature condition is controlled by a comparator 428, which compares an internally set reference voltage to one obtained by voltage division of the bandgap reference, via an external resistor-thermistor pair that is connected to the comparator's remaining input, externally ported as "LSRTMP".

It will be understood that each of the elements described above, or two or more together, also may find a useful application in other types of constructions differing from the types described above.

While the invention has been illustrated and described as embodied in a stand-alone fixture for converting the operation of a hand-held laser scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A circuit for digitizing an analog electric signal generated from a photoelectronic conversion of light reflected off scanning indicia having spatially-separated, light-reflective portions, comprising:

first differentiating means for differentiating the analog electric signal to generate a first differentiated signal;

second differentiating means for differentiating the first differentiated signal to generate a second differentiated signal;

comparator means for comparing the first and second differentiated signals to generate a digital electrical signal from the indicia being scanned; and output means for producing a digital output signal corresponding to the digital electrical signal.

2. The circuit according to claim 1, further comprising a voltage limiting circuit disposed between an output of the first differentiating means and an input of the comparator means.

3. The circuit of claim 1, wherein the output means comprises a switch for receiving the digital electric signal and producing the digital output signal.

4. A circuit for digitizing an analog electric signal generated from a photoelectronic conversion of light reflected off scanning indicia having spatially-separated, light-reflective portions, comprising:

differentiator circuit means for generating a first derivative signal representing a first derivative of the analog signal;

means for generating a comparison signal which does not require additional derivatives of the analog signal;

output means, coupled to the differentiator circuit means and to the generating means, for comparing the first derivative signal and the comparison signal to generate a digital output signal indicating a change in the intensity of the reflected light; and an output controller, coupled to the output means, for controlling passage of the digital output signal according to values of the first derivative signal.

5. The circuit of claim 4, further comprising means for limiting peak values of the first derivative signal.

6. The circuit of claim 4, wherein the output means comprises a switch for generating the digital output signal.

* * * * *